April 26, 1938.    H. M. SUTTON ET AL    2,115,674
APPARATUS FOR REMOVING FRIABLE MATTER FROM BEANS, PEAS, AND OTHER LEGUMES
Filed April 25, 1936    4 Sheets-Sheet 1
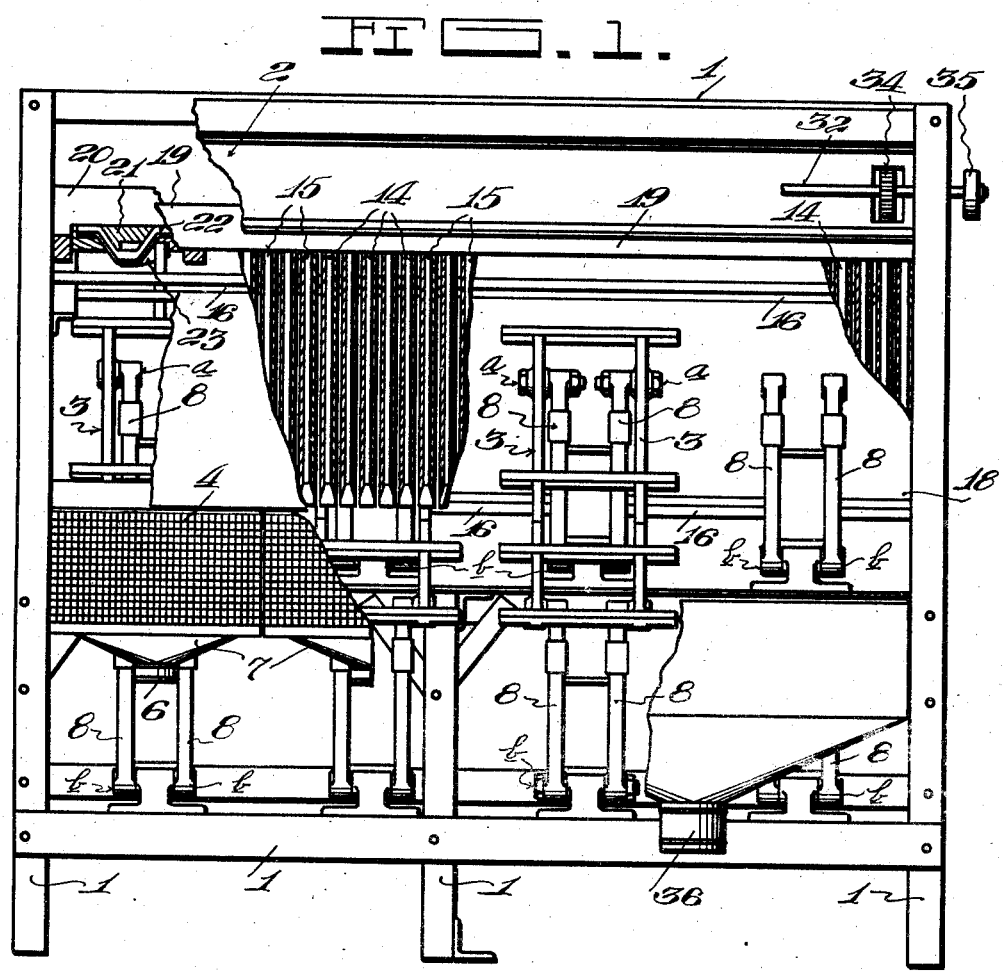
Henry M. Sutton
Edwin G. Steele
INVENTORS
BY
ATTORNEY.

April 26, 1938. H. M. SUTTON ET AL 2,115,674
APPARATUS FOR REMOVING FRIABLE MATTER FROM BEANS, PEAS, AND OTHER LEGUMES
Filed April 25, 1936 4 Sheets-Sheet 2
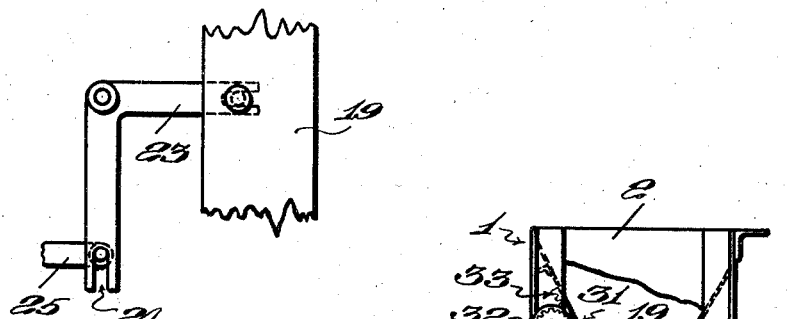
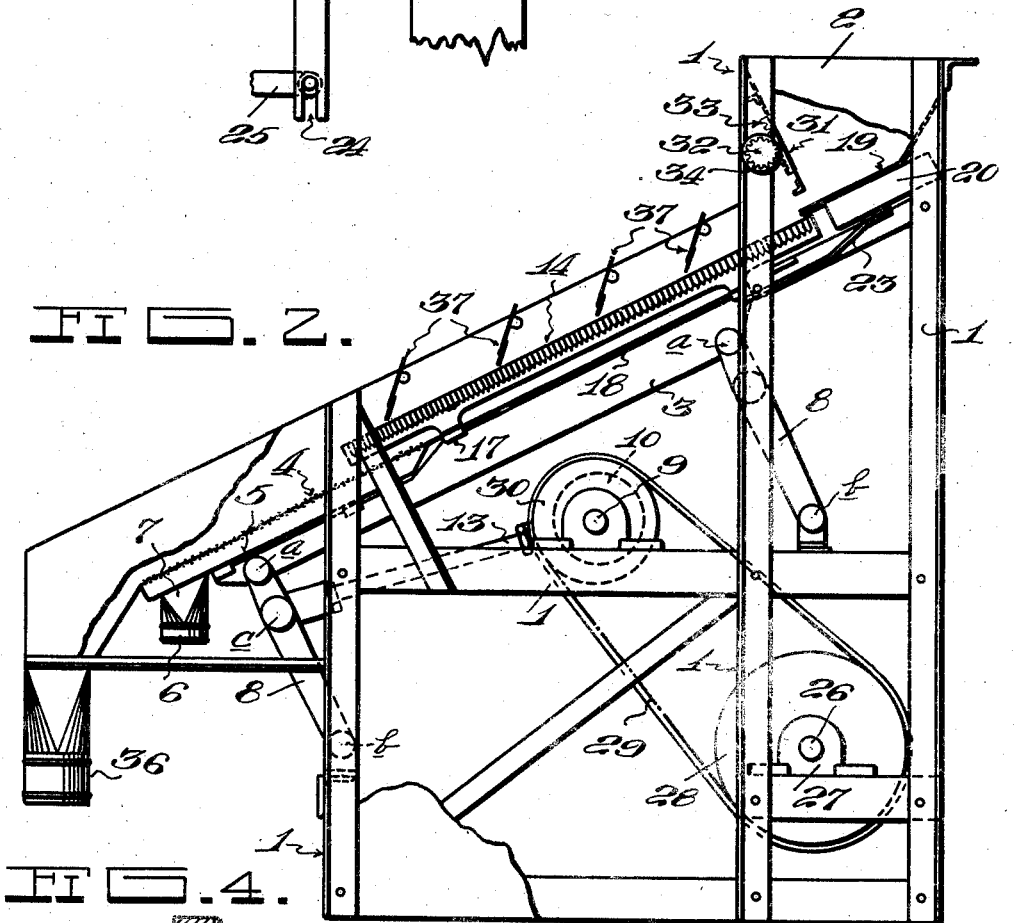
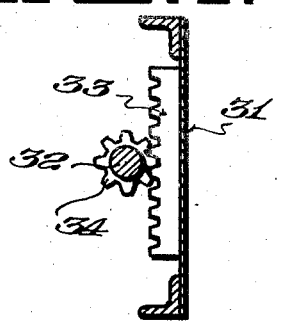
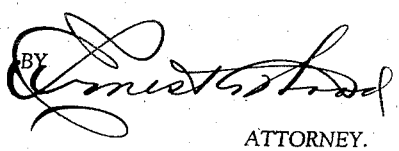
Henry M. Sutton
Edwin G. Steele
INVENTORS
BY
ATTORNEY.

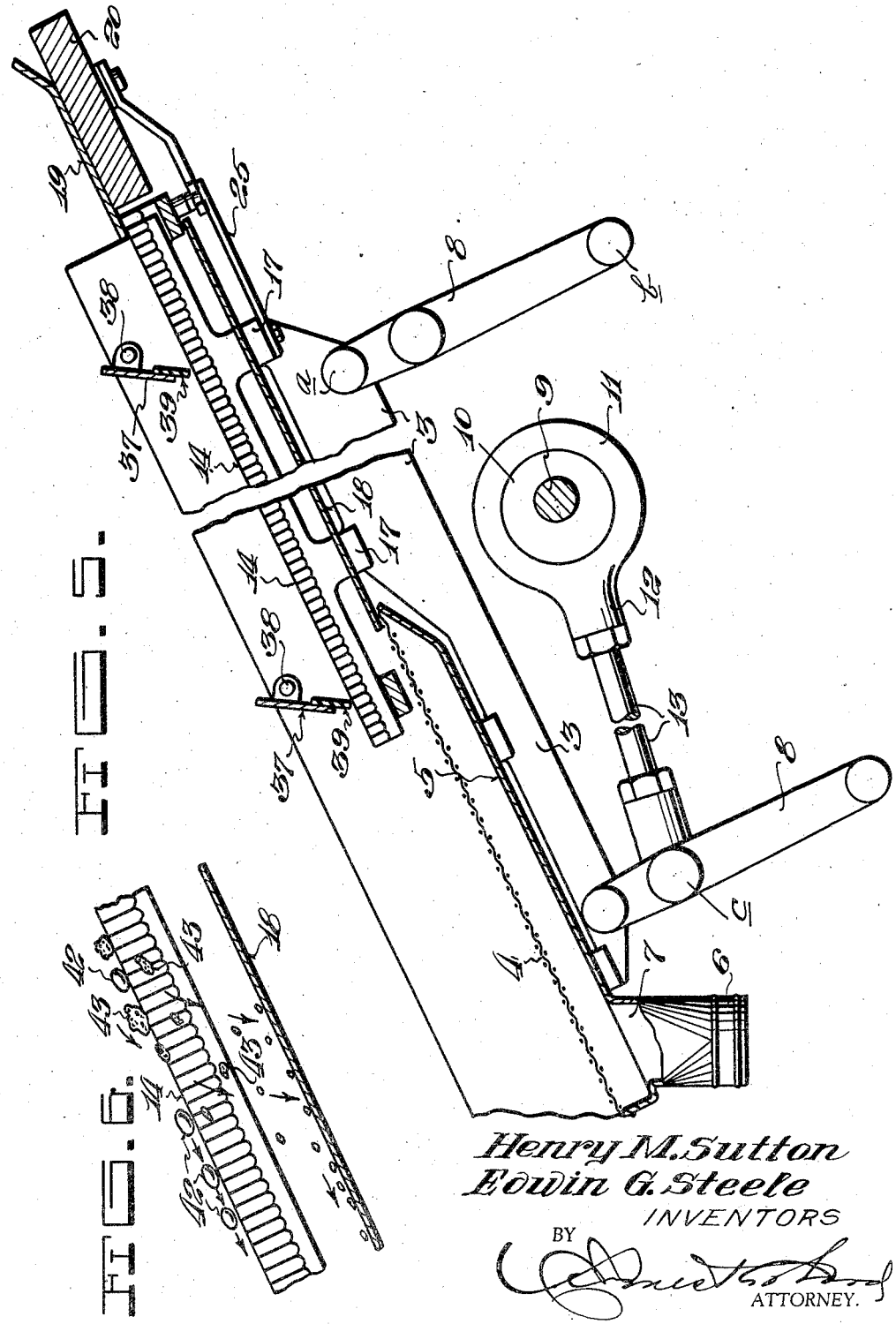

April 26, 1938.  H. M. SUTTON ET AL  2,115,674
APPARATUS FOR REMOVING FRIABLE MATTER FROM BEANS, PEAS, AND OTHER LEGUMES
Filed April 25, 1936  4 Sheets-Sheet 4
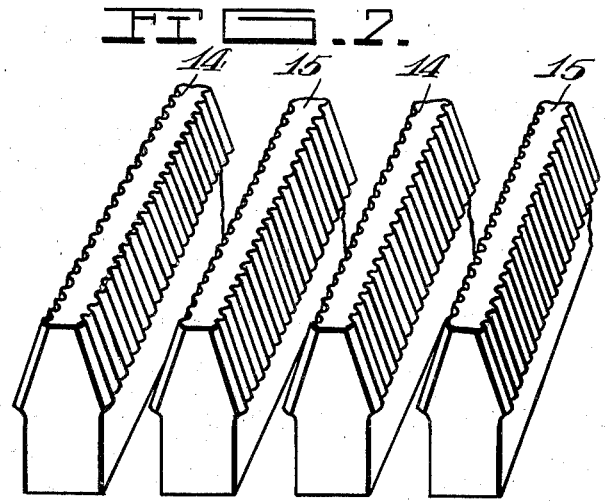
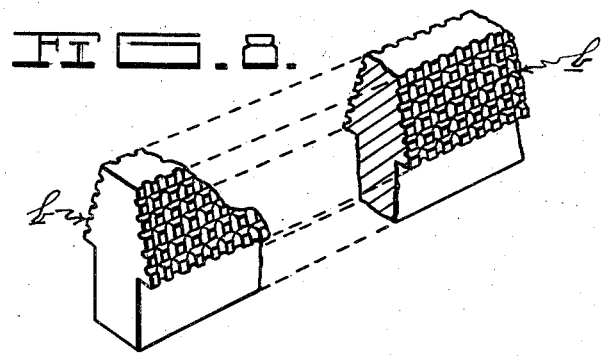
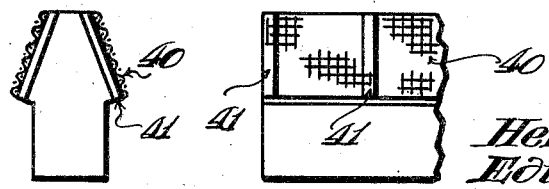
Henry M. Sutton
Edwin G. Steele
INVENTOR.
ATTORNEY Patented Apr. 26, 1938

2,115,674

UNITED STATES PATENT OFFICE 2,115,674

APPARATUS FOR REMOVING FRIABLE MATTER FROM BEANS, PEAS, AND OTHER LEGUMES

Henry M. Sutton and Edwin G. Steele, Dallas, Tex.

Application April 25, 1936, Serial No. 76,350

4 Claims. (Cl. 209—6)

This invention relates to an improved apparatus and process for removing from beans, peas and legumes friable matter such as clay and mud balls and the like and it has particular reference to a machine and process by which mud and clay balls are effectively pulverized and separated from the commodities without damage to the latter.

The primary object of the invention is to remove from beans, peas and the like, clay and mud balls or clods and other such friable substances by a method of selective crushing. Heretofore, this has been partially accomplished by passing such a contaminated mixture over a series of rotated crushing rolls, the diameters of which bear the proper ratio with the legumes treated that the angle of "nip" is not sufficient to catch hold of and crush such smooth objects as peas, beans and the like. However, the clay and mud balls and such other friable materials as possess a rough exterior, present enough friction to the roller surfaces to enable them to hold and crush such materials to a more or less fine powder, while the commodity passes across the surface of such rolls and are not crushed thereby.

In machines of this character, rolls of different size must be used for beans of different size, otherwise if small beans and the like are passed across rolls too large in diameter, they too will be crushed along with the objectionable impurities. This obviously requires an operator to keep on hand a number of rolls of a variety of sizes, suitable to the size of the stock to be treated. The operator must therefore always bear in mind that the angle of "nip" of the rolls must be just sufficient to engage and crush the adobe mud balls or other friable substances without injury to the stock undergoing treatment.

Broadly, the present invention aims to overcome objectionable characteristics of the former processes by providing cooperative elements arranged for alternate reciprocation by which it is possible to selectively crush the particles passing thereover, that is to say, elements for discriminating to a fine degree of effectiveness, between substances having a smooth, uniform surface and those having rough and irregular surfaces, to thus remove from the mass of stock, the foreign matter and pulverize the latter, yet allowing the former to pass and report at a point remote from the refuse materials.

With the foregoing objects as paramount, the invention has particular reference to the salient features of construction of the machine and to the novel steps of the method, as set forth in the annexed description and illustrated in the accompanying drawings, wherein:—

Figure 1 is a front elevational view of a machine constructed according to the present invention.

Figure 2 is a side elevational view of Figure 1.

Figure 3 is a fragmentary detail view of an agitator for the commodity hopper and its operating means.

Figure 4 is a detail view in vertical section of the feed hopper slide gate or control.

Figure 5 is an elevational view, partly in section showing the vibratory grate bar assembly and screen cradle with details of the operating means.

Figure 6 is a schematic view showing fragmentarily a grate bar and dust pan and effect of the former on the substances passed thereover.

Figure 7 is a perspective view fragmentarily showing the preferred form of grate bar, in assembly.

Figure 8 is a fragmentary perspective view of a modified form of grate bar.

Figure 9 is an end view of a further modified form of vibrating bar, and

Figure 10 is a fragmentary side elevation of the bar shown in Figure 9.

The present invention is unique in one of many respects in that the machine is gravity fed, the quantity of commodity to be cleaned being under absolute control at all times. Moreover, it is superior to roller processes inasmuch as the rollers are required to be renewed or replaced frequently. These rollers being constructed of rubber, become roughened either from long use or from the admixture of hard rocks which sometimes pass therebetween, their surfaces soon become so rough as to provide sufficient friction to gain a hold upon the bean stock and crush the same along with the impurities. The present invention overcomes entirely these objectionable characteristics of the roller processes by providing the operator with a machine capable of accommodating itself to any size bean or legume stock, remove the undesirable substances therefrom without injury to the stock and with a capacity far in excess of the older methods.

Continuing with a more detailed description of the drawings, I designates the frame of the machine, constructed principally of angle iron. The rear legs of the machine, in pairs, are of equal length to support an elongated hopper 2, extending from one end of the machine to the other. The forward legs are somewhat shorter, since the material is caused to move by gravity from the hopper 2 toward the front of the machine, hence the surface over which the material passes must be inclined.

Suspended between the legs of the frame 1 is a cradle 3, which, as apparent in Figures 2 and 5 supports a screen 4. Beneath the screen 4 is a dust pan 5, designed to receive pulverized dust particles resulting from the grinding or crushing action of the bar assembly to be described presently. The dust pan 5 empties into the dust discharge spout 6, several of which are shown, each having a hopper-like connection 7 with the dust pan 5.

The upper end of the cradle 3 is supported by a cradle link 8, pivotally connected at $a$ to the cradle and at $b$ to the frame 1, (Figures 2 and 5). A similar link 8 is likewise connected to the lower end of cradle 3 and to the forward portion of the frame. The result therefore is an oscillating motion of the cradle when the shaft 9 is rotated by a suitable power means (not shown).

The shaft 9 carries an eccentric 10, surrounding which is a freely mounted ring 11 (Figure 5) having a threaded projection 12 to receive the end of a pitman 13, the opposite end of this pitman being connected at $c$ to a point intermediate the ends of the forward link 8 of the cradle 3. Thus it will be seen that rotation of shaft 9 to which the eccentric 10 is affixed, will reciprocate the arm 13, thereby imparting to the cradle 3 a reciprocating and slightly oscillating motion and that material supported indirectly thereon, or at least affected by such action of the cradle, will receive a forward thrust, combined with a gravitational urge, which propels the material from the hopper 2 over the crushing bars toward the discharge end of the machine.

The crushing or vibrating bars 14, referred to in the foregoing description are arranged in parallel relationship but certain of the bars are capable of longitudinal reciprocation to a limited extent. In the present case, one set of bars is stationary, these being identified by the reference numeral 15 arbitrarily, in Figure 1, and disposed alternately with respect to the movable bars 14. The stationary bars 15 are affixed by screws or equivalent means to transverse rails 16 (Figure 1) disposed near the hopper 2 and adjacent the lower ends of the bars. The movable bars 14 are joined together by the interconnecting cross-members 17 (Figures 2 and 5) which members also secure the movable dust pan 18 for movement with the bars 14 and down which the impurities filtering between the bars gravitates to be finally received in the dust pan 5, mentioned previously.

The hopper 2 has a movable bottom 19 disposed upon the bearing surface afforded by a member 20 (Figures 1 and 5). This member 20 is stationary and as apparent in Figure 1 is slotted at 21 to admit a bracket 22 which provides a connection between a bell crank 23 and the movable bottom plate 19 of the hopper 2.

One end of the bell crank 23 (Figure 3) is slotted at 24 and to this end of the crank is connected a link 25, the latter in turn being secured to the cradle 3.

Within the rear part of the frame 1 is mounted a counter-shaft 26 in bearings 27 and which shaft carries a pulley 28 (Figure 2). A belt 29 surrounds this pulley and a pulley 30, mounted on the shaft 9 which latter carries the eccentric 10, previously mentioned.

It is apparent from the foregoing that when rotative motion is imparted to shaft 26 and therefore pulley 28, pulley 30 will be rotated to actuate the eccentric 10. Such actuation reciprocates the pitman arm 13 to oscillate the cradle 3 through the supporting links 8.

It will be remembered that alternate ones of the grate bars are stationary, identified by numeral 15, while the remaining bars, being connected to the oscillating cradle 3, are moved longitudinally when the cradle is actuated as explained. Such material as is allowed to be released from the hopper 2 is subjected to the cooperative pulverizing action of the grate bars and their construction is such that only those particles having smooth, uniform surfaces, such as beans, peas, etc., escape this action.

To control and render uniform the discharge of the hopper 2, a slide gate 31 (Figure 4) is provided at the hopper opening and controlled by a shaft 32, disposed longitudinally of the hopper. The gate has one or more racks 33 thereon, whose teeth enmesh those of pinions 34 carried by the shaft 32. By rotating the hand wheel 35 (Figure 1), shaft 32 is rotated to move the slide gate either up or down to respectively increase and decrease the hopper discharge opening.

The material thus released from the hopper 2 gravitates downward, aided in its travel by the vibratory action of the grate bars 14, operated by the cradle 3.

The good stock, mature beans, peas or other legumes being processed will report at and be discharged through the spout 36; after having traversed the foraminous surface 4, whose perforations are of such size as to admit only the fine particles of foreign matter escaping the action of the bars 14 and 15. Other and finer particles of this matter fall between the bars onto the dust pan 18 immediately therebelow and are conveyed thereby to the screen 4 to be received by the forward dust pan 5 after having passed through the screen. Subsequently, this matter is discharged through the spout 6.

At intervals along the length of the processing surface of the machine, there is provided retarding baffles 37, pivoted at 38 and provided with a strip of flexible material 39 (Figure 5) under which moves the mass being processed. These baffles prevent the material from being precipitated too rapidly over the processing surfaces of the grate bars 14—15.

Since the outstanding object of the invention resides in the peculiar construction and function of the grate bars 14—15, these have been depicted in various modified forms in Figures 7 to 10 inclusive, the assembly in Figure 7 being the preferred form.

In Figure 7, the bars are shown as being broadly in the shape of a truncated arrow head in transverse section, the angular sides of which are fluted along their minor axes. These flutes afford a grinding surface, which is effective to pulverize the relatively friable balls of clay. The smooth surface of the beans or the like, however, will not yield to the grip of the bars, and hence the beans escape the grinding effects of the grinding action during their travel while supported by the angular sides of the fluted bars.

The modified form of grate bar shown in Figure 8 provides a studded grinding or pulverizing surface $b$ while that shown in Figures 9 and 10 provides a foraminous surface 40, spaced from the bars by ribs 41. By thus spacing the abrading surface from the bar proper, the pulverized material may pass through this surface and precipitate between the surface and the side of the bar.

An example of the action of the bars 14—15 on the material is shown in Figure 6 in which 42 indicates the beans with the attendant foreign matter 43 which is being removed. It will be noted that as the bars act on the material 43, it is crushed to such size that it will readily pass between the bars to be received on the inclined dust pan 18 to be eventually received on the dust pan 5 for disposal through the spouts 6.

Manifestly, the construction shown is capable of considerable modification and such modification as is considered within the scope and meaning of the appended claims is also considered within the spirit and intent of the invention.

What is claimed is:

1. A machine for selectively crushing and removing undesirable substances in bean stock by disintegration of said substances including a separating surface composed of an inclined assembly of relatively parallel grate bars, spaced to define troughs having angularly convergent and roughened walls and to admit only disintegrated particles and means for axially reciprocating alternate ones of said bars to frictionally disintegrate susceptible materials fallings into said troughs and to transport bean stock passed over said surface.

2. Apparatus for separating friable substances from leguminous plant stock by disintegration of said substances including a multiplicity of juxtapositioned and relatively parallel grate bars collectively affording an inclined surface, the contiguous sides of said grate bars being roughened and angularly convergent to define a plurality of relatively parallel and bottomless troughs and means for axially reciprocating alternate ones of said grate bars to subject susceptible matter falling into said troughs to a frictionally disintegrating action to effect passage thereof between said bars.

3. Apparatus for removing friable matter from beans, peas and other legumes including a separating surface composed of an inclined assembly of relatively parallel and equi-distantly spaced grate bars whose contiguous sides are convergently inclined and roughened to engage and disintegrate irregular friable particles but of such distance apart as to reject said legumes and means to impart to alternate ones of said bars a reciprocating motion to disintegrate said friable particles for collection at a point remote from the reporting point of said legumes.

4. Apparatus for separating friable substances from beans, peas and other legumes including an inclined separating surface composed of a plurality of relatively spaced grate bars whose confronting sides are angularly convergent and roughened but whose spacing is not sufficient to admit said legumes, the said bars being cooperatively capable of engaging and disintegrating particles of friable matter to the exclusion of said legumes when actuated and means for imparting to alternate ones of said bars an independent reciprocating action.

HENRY M. SUTTON.
EDWIN G. STEELE.